US011515941B2

(12) United States Patent
Coward et al.

(10) Patent No.: US 11,515,941 B2
(45) Date of Patent: Nov. 29, 2022

(54) FREE SPACE OPTICAL COMMUNICATION TERMINAL WITH DISPERSIVE OPTICAL COMPONENT

(71) Applicant: SA Photonics, Inc., Los Gatos, CA (US)

(72) Inventors: James F. Coward, Washougal, WA (US); Greg G. Mitchell, Elk Grove, CA (US)

(*) Notice: Subject to any disclaimer, the term of this patent is extended or adjusted under 35 U.S.C. 154(b) by 0 days.

(21) Appl. No.: 17/394,287

(22) Filed: Aug. 4, 2021

(65) Prior Publication Data

US 2022/0045753 A1 Feb. 10, 2022

Related U.S. Application Data

(60) Provisional application No. 63/061,128, filed on Aug. 4, 2020.

(51) Int. Cl.
*H04B 10/112* (2013.01)
*H04B 10/61* (2013.01)
*H04B 10/114* (2013.01)
*H04B 10/25* (2013.01)
*H04B 10/29* (2013.01)
(Continued)

(52) U.S. Cl.
CPC ..... *H04B 10/1125* (2013.01); *H04B 10/1143* (2013.01); *H04B 10/25* (2013.01); *H04B 10/29* (2013.01); *H04B 10/50* (2013.01); *H04B 10/614* (2013.01); *H04B 10/66* (2013.01); *G02B 6/32* (2013.01)

(58) Field of Classification Search
CPC ....... H04B 10/1125; H04B 10/1143; H04B 10/25; H04B 10/29; H04B 10/50; H04B 10/614; H04B 10/66; G02B 6/32
See application file for complete search history.

(56) References Cited

U.S. PATENT DOCUMENTS 4,518,854 A 5/1985 Hutchin
6,839,519 B1 1/2005 Kleiner et al.
(Continued)

FOREIGN PATENT DOCUMENTS

EP 0256809 A2 * 2/1988 ......... G02B 6/29307
EP 2366946 A1 * 9/2011 ........... G02B 26/001
(Continued)

OTHER PUBLICATIONS

PCT International Search Report and Written Opinion, PCT Application No. PCT/US21/44555, dated Nov. 3, 2021, 13 pages.

*Primary Examiner* — Abbas H Alagheband
(74) *Attorney, Agent, or Firm* — BakerHostetler

(57) ABSTRACT

Embodiments relate to a local free space optical (FSO) terminal that transmits and receives optical beams. The FSO terminal includes a fore optic and a dispersive optical component. A receive (Rx) optical beam from a remote FSO terminal is received and focused by the fore optic to a Rx spot at a focal plane of the fore optic. A transmit (Tx) optical beam with a different wavelength forms a Tx spot at the focal plane and is collimated and projected by the fore optic to the remote FSO terminal. The dispersive optical component is positioned along optical paths of both the Rx beam and the Tx beam. Among other advantages, a wavelength dependence of the dispersive optical component laterally separates the Rx spot and the Tx spot at the focal plane.

20 Claims, 13 Drawing Sheets

(51) Int. Cl.
*H04B 10/50* (2013.01)
*H04B 10/66* (2013.01)
*G02B 6/32* (2006.01)

(56) References Cited

U.S. PATENT DOCUMENTS

| | | | | |
|---|---|---|---|---|
| 7,454,100 B2 * | 11/2008 | Corem | ............... | G02B 6/29311 |
| | | | | 385/16 |
| 8,160,452 B1 | 4/2012 | Tidwell et al. | | |
| 8,995,841 B1 | 3/2015 | Chalfant et al. | | |
| 9,800,332 B2 * | 10/2017 | Chalfant, III | .......... | G02B 13/22 |
| 9,810,862 B2 * | 11/2017 | Graves | ................ | G02B 6/4206 |
| 9,973,274 B1 * | 5/2018 | Graves | ............... | H04B 10/1123 |
| 10,298,325 B1 | 5/2019 | Birnbaum et al. | | |
| 10,439,716 B2 | 10/2019 | Miller et al. | | |
| 10,446,369 B1 * | 10/2019 | Phillips | ............... | H01J 37/3005 |
| 10,612,915 B2 | 4/2020 | Miller et al. | | |
| 10,903,901 B2 * | 1/2021 | Mitchell | ................ | H04B 10/11 |
| 2006/0182448 A1 * | 8/2006 | Chalfant, III | .......... | H04B 10/40 |
| | | | | 398/131 |
| 2015/0188628 A1 * | 7/2015 | Chalfant, III | ........ | H04B 10/112 |
| | | | | 398/131 |
| 2015/0378242 A1 | 12/2015 | Auxier et al. | | |
| 2017/0052334 A1 * | 2/2017 | Graves | ................ | G02B 6/4206 |
| 2017/0054499 A1 * | 2/2017 | Graves | ................. | H04B 10/40 |
| 2018/0083700 A1 | 3/2018 | Graves et al. | | |
| 2019/0013865 A1 | 1/2019 | Boruah et al. | | |
| 2019/0379454 A1 * | 12/2019 | Mitchell | .............. | G02B 6/4249 |
| 2021/0103153 A1 * | 4/2021 | Goodno | .................. | H01S 3/1307 |

FOREIGN PATENT DOCUMENTS

| | | | | | |
|---|---|---|---|---|---|
| JP | 2004233485 A | * | 8/2004 | | |
| JP | 3735064 B2 | * | 1/2006 | .......... | G02B 6/4206 |
| JP | 2013545107 A | * | 12/2013 | ............. | H04L 45/50 |
| WO | WO-2021015802 A1 | * | 8/2019 | ......... | H04B 10/0771 |

* cited by examiner

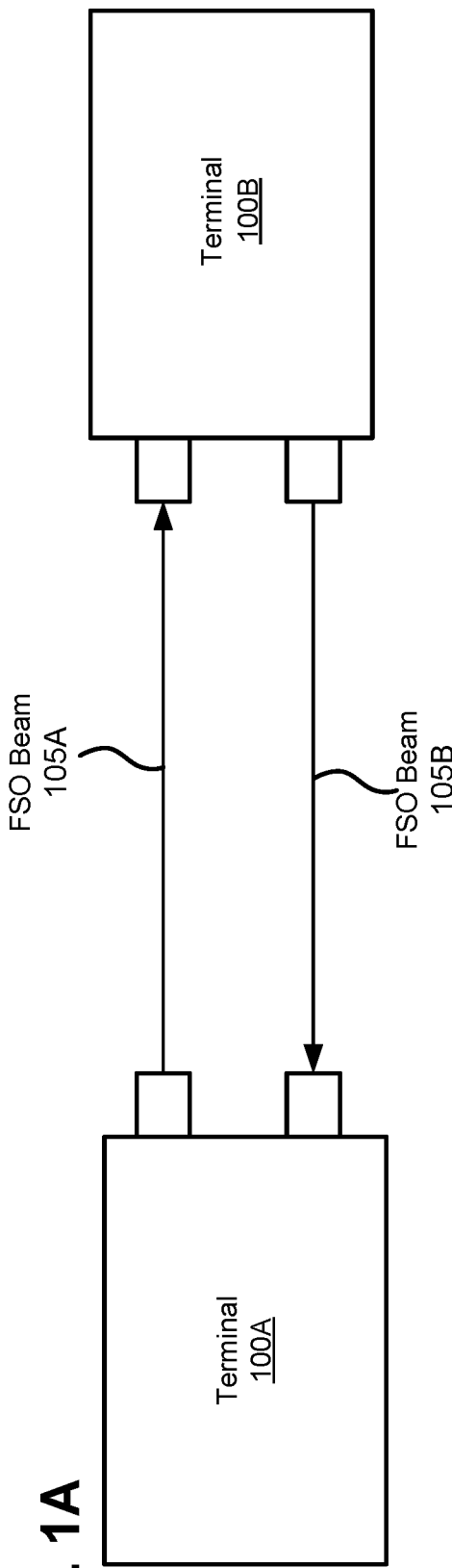
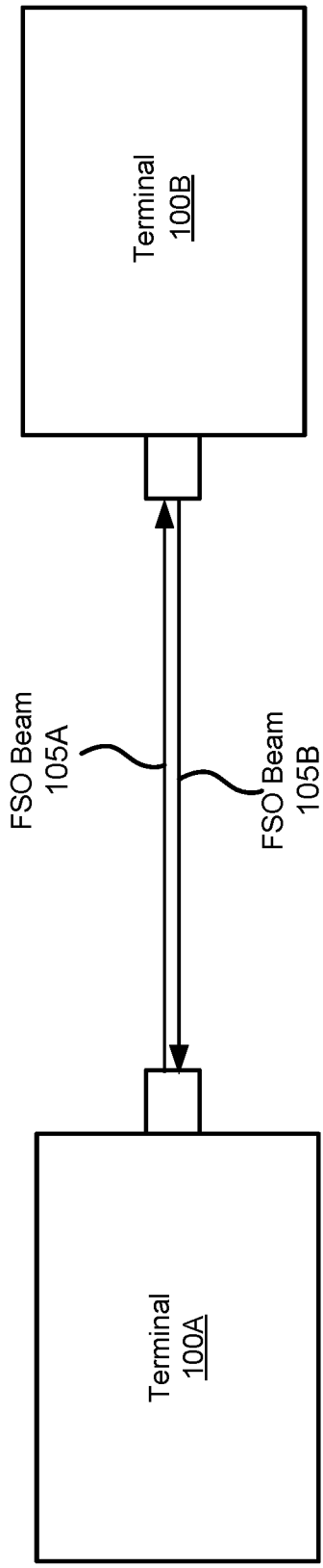
FIG. 1A
FIG. 1B

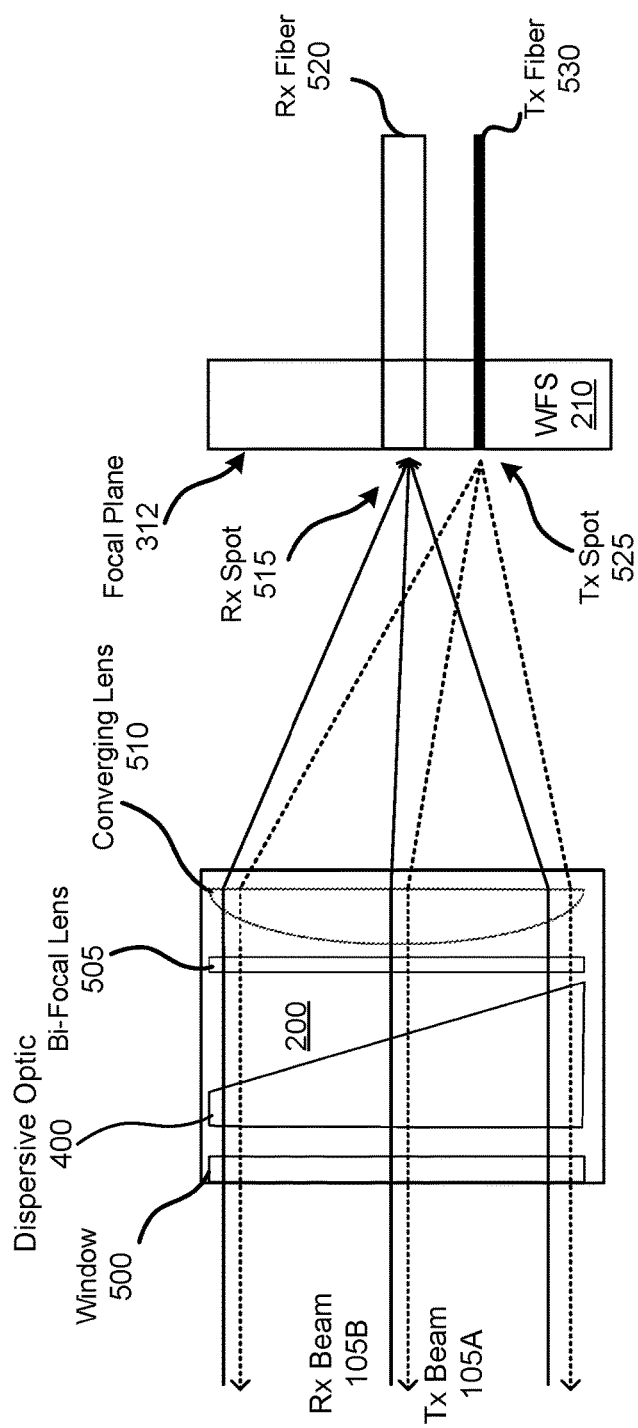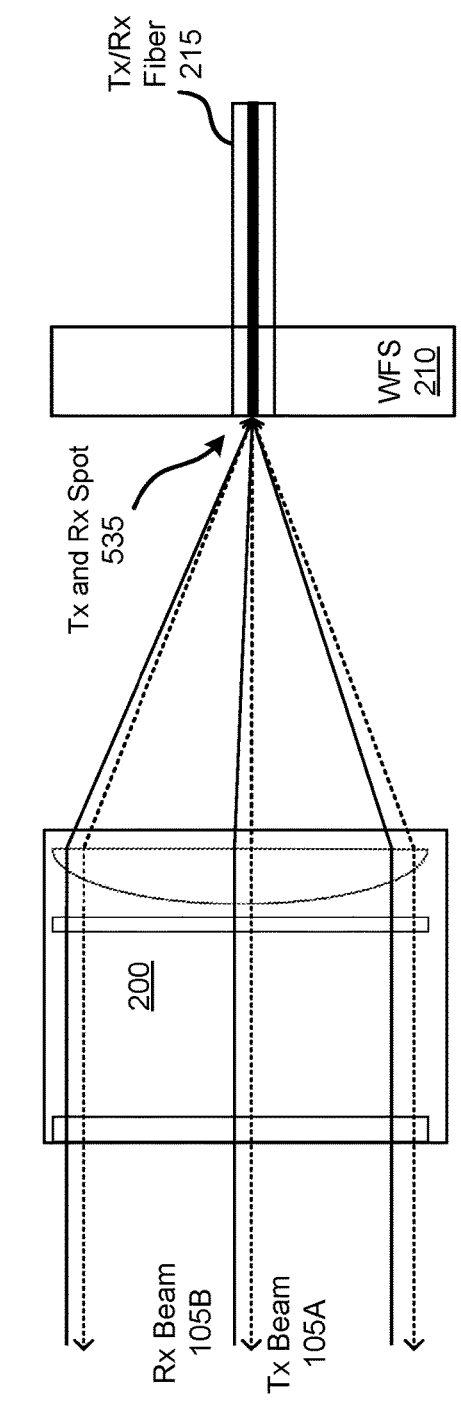
FIG. 5A
FIG. 5B

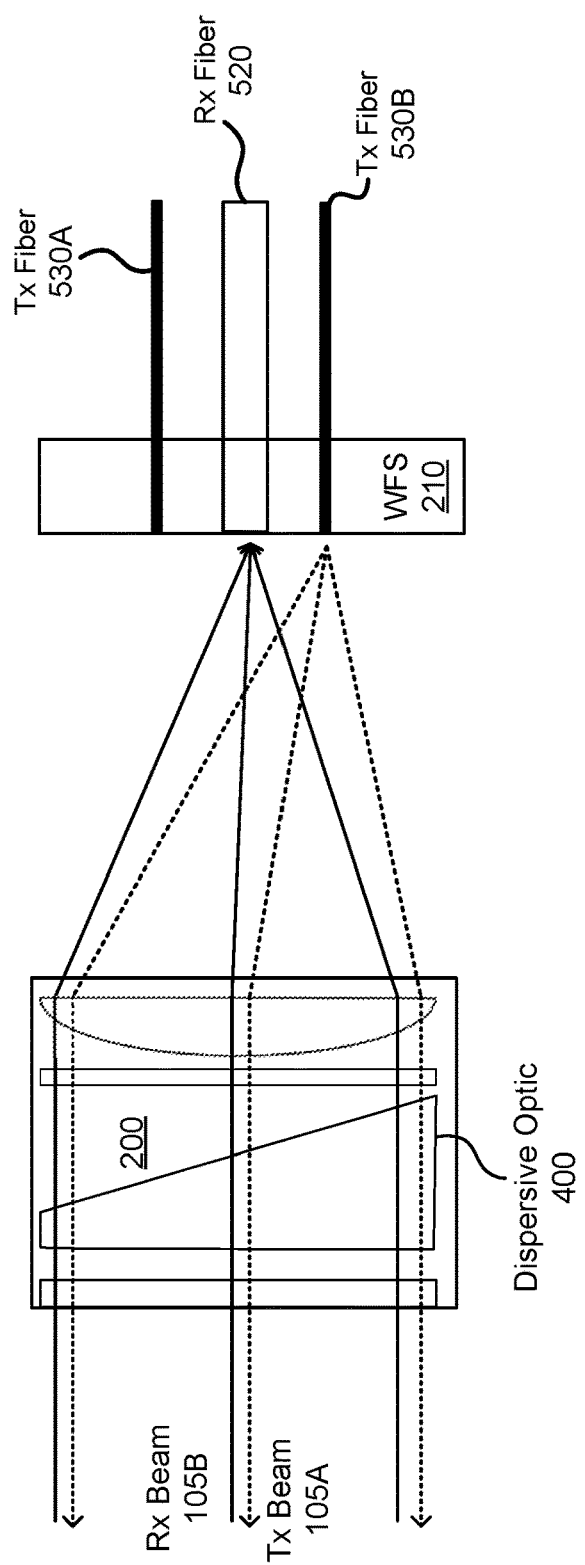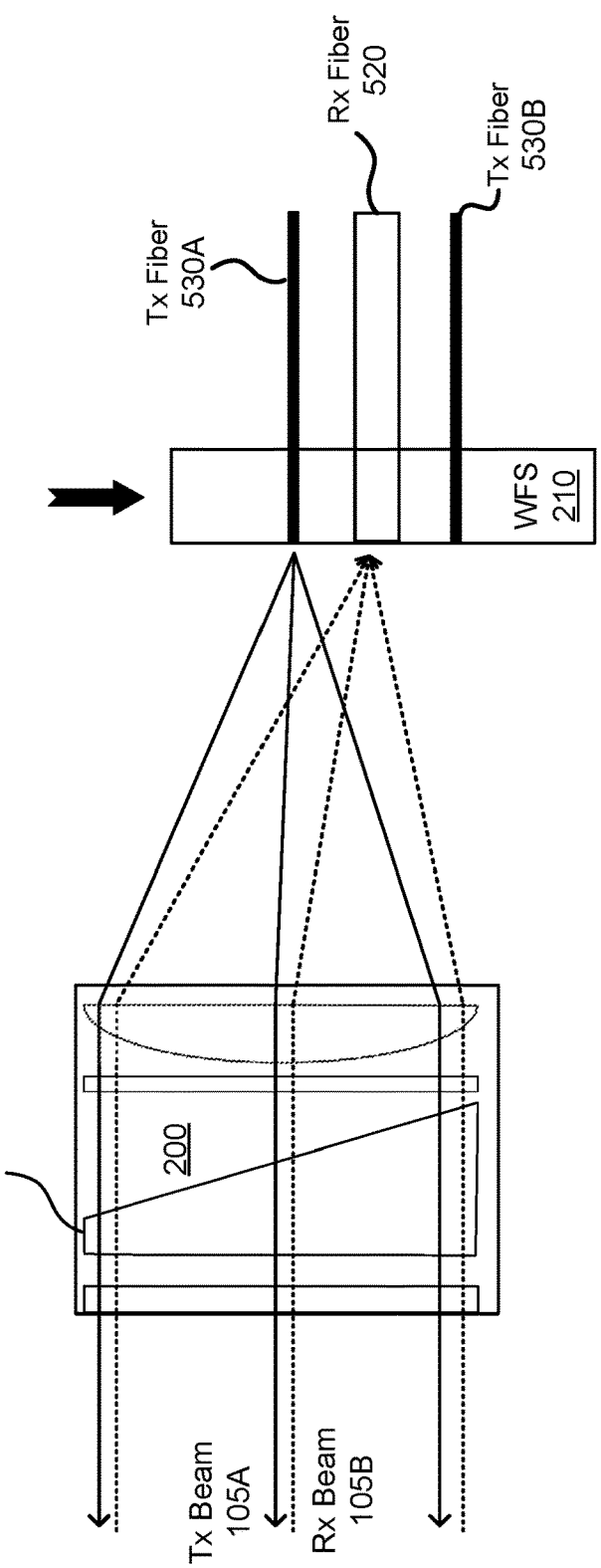
FIG. 7A
FIG. 7B

FREE SPACE OPTICAL COMMUNICATION TERMINAL WITH DISPERSIVE OPTICAL COMPONENT

CROSS-REFERENCE TO RELATED APPLICATIONS

This application claims priority under 35 U.S.C. § 119(e) to U.S. Provisional Patent Application Ser. No. 63/061,128, "Free Space Optical Communication System with Receive/Transmit Beam Separation and Optional Point Ahead," filed Aug. 4, 2020, which is incorporate herein by reference in its entirety.

The present disclosure relates to U.S. patent application Ser. No. 17/394,294, entitled "Free Space Optical Communication Terminal with Actuator System and Optical Relay System" and filed on Aug. 4, 2021, the content of which is incorporated by reference.

BACKGROUND

1. Technical Field

This disclosure relates generally to free space optical (FSO) communication terminals and, more particularly, to a FSO communication terminal with a dispersive optical component.

2. Description of Related Art

Free space optical (FSO) communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations.

In contrast with other electromagnetic communications means, FSO signals (also referred to as beams) are more directional. The directionality confers benefits both for communications capacity and for communications privacy. However, FSO technology typically requires accurate pointing between terminals to establish and maintain a viable FSO link. Furthermore, some FSO terminals use circulators or beam splitters to combine and separate optical beams, however these components may result in optical losses.

SUMMARY

Some embodiments relate to a local free space optical (FSO) communication terminal that transmits (e.g., data-encoded) optical beams to and receives (e.g., data-encoded) optical beams from a remote FSO communication terminal. The local FSO terminal includes a fore optic and a dispersive optical component. A receive (Rx) optical beam from the remote FSO communication terminal is received and focused by the fore optic to a Rx spot at a focal plane. Additionally, a transmit (Tx) optical beam forms a Tx spot at the focal plane and is collimated and projected by the fore optic to the remote FSO communication terminal. The dispersive optical component is positioned along optical paths of both the Rx and Tx optical beams. Since the Rx and Tx optical beams have different wavelengths and the dispersive optical component has a wavelength dependence, the dispersive optical component laterally separates the Rx spot and the Tx spot at the focal plane when the Rx and Tx optical beams are propagating along opposite directions. By using the dispersive optical component to separate the Tx and Rx spots, the local terminal may avoid the use of a circulator or beam splitter for this purpose. Removing the circulator or beam splitter may reduce optical losses of the local terminal.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIGS. 1A and 1B are block diagrams of two terminals communicating via FSO communication links.

FIGS. 5A-5B are cross-section diagrams of a telescope and the wavefront sensor.

FIGS. 7A-7C are cross-section diagrams of the wavefront sensor coupled to multiple Tx or Rx fibers.

DETAILED DESCRIPTION

Figure 2A:
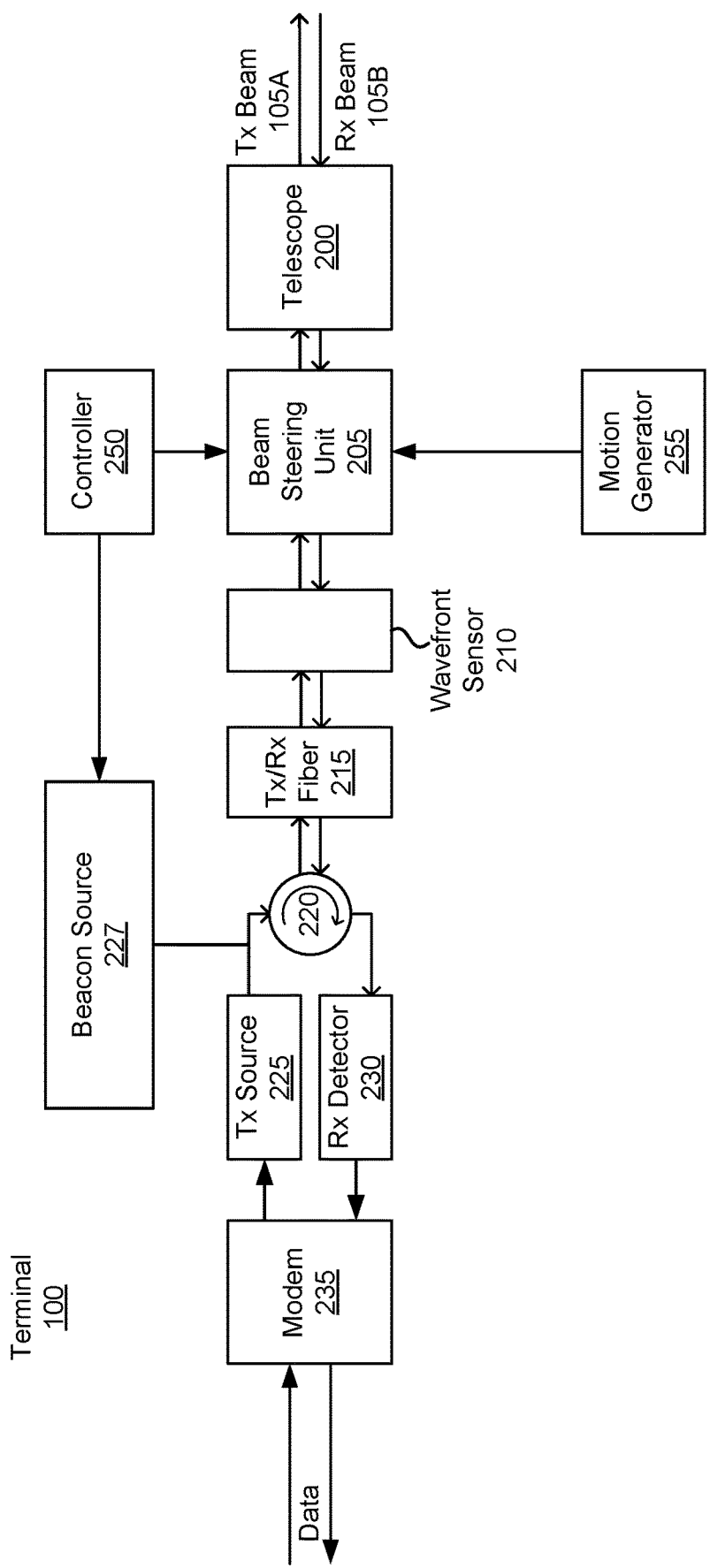
FIG. 2A is a block diagram of a single terminal.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Before describing further details of the dispersive optical component, the actuator system, and the optical relay system, FIGS. 1-3 describe operation of FSO terminals.

FSO Communication Terminals

FIGS. 1A and 1B are block diagrams of terminals 100A and 100B (also referred to as nodes) communicating via free space optical (FSO) communication links, according to some embodiments. Specifically, the terminals 100 are communicating by transmitting and receiving FSO beams 105. In FIG. 1A, each terminal 100 receives and transmits FSO beams 105 through different apertures, while in FIG. 1B, the terminals are co-boresighted so that beams are received and transmitted though the same aperture. In the co-boresighted approach, the same primary optical system may carry signals both for Tx and Rx paths, reducing weight and complexity of separate optical components for Tx and Rx beams. A co-boresighted optical design also simplifies the system and enhances reliability by eliminating separate pointing and tracking mechanisms for Tx and Rx. As described herein, if terminal 100A is referenced as a local terminal, terminal 100B may be referred to as a remote terminal, beam 105A may be referred to as a transmit (Tx) beam, and beam 105B may be referred to as a receive (Rx) beam.

Terminals 100 typically transmit and receive beams at different wavelengths to avoid or reduce beam interference. These wavelengths may be predetermined according to FSO communication standards or specifications. Typically, two wavelengths (or wavelength ranges) are available for selection, where one wavelength is selected for the Tx beam and the other wavelength is selected for the Rx beam (although more than two wavelengths may be available). For example, the Rx beam has a wavelength of 1532 nanometers, and the Tx beam has a wavelength of 1536 nanometers (note that these wavelengths are switched for the remote terminal). In cases where many terminals communicate pairwise, each terminal may be configured to transmit or receive on either of the two wavelengths. In this way, any terminal can communicate with any other terminal. Many optical telecommunications entities use the wavelength grid recommendations defined by the ITU (International Telecommunication Union) (e.g., publication G.694.1 or G.694.2). It may be beneficial to select Tx and Rx wavelengths from ITU grids or from the wavebands they cover because reliable, highly tested equipment may be readily and cheaply available. For some embodiments, one or both of the Tx and Rx wavelengths may be within 100 nm of 1064 nm, where Nd:YAG lasers and compatible photodetectors are readily available.

FIG. 2A is a block diagram of a single terminal 100. The terminal 100 includes a data I/O interface (not shown), modem 235, Tx source 225, beacon source 227, Rx detector 230, a circulator 220, a Tx/Rx fiber 215, a wavefront sensor 210, a beam steering unit 205, a telescope 200, a motion generator 255, and a controller 250. In FIG. 2A, electrical signals (both analog and digital) are indicated by the solid arrows and optical signals (both guided and free space) are indicated by the line arrows.

The components are optically coupled as follows. The telescope 200 is optically coupled to the beam steering unit 205. The beam steering unit 205 is optically coupled to the wavefront sensor 210. It is also optically coupled to the circulator 220 via the fiber 215. The ports of the optical circular 220 are optically coupled to the Tx source 225 and source 227 (which are combined into one port), the Tx/Rx fiber 215, and Rx detector 230.

The components are electrically coupled as follows. The controller 250 is electrically coupled to the beam steering unit 205 and the beacon source 227. The modem 235 is electrically coupled to the Tx source 225 and the Rx detector 230. The modem 235 may also receive data from the wavefront sensor 210 (after conversion to digital form) and it may provide data to the controller 250. In some embodiments, the controller 250 is electrically coupled to the wavefront sensor 210, the modem 235, and/or the motion generator 255.

Figure 2B:
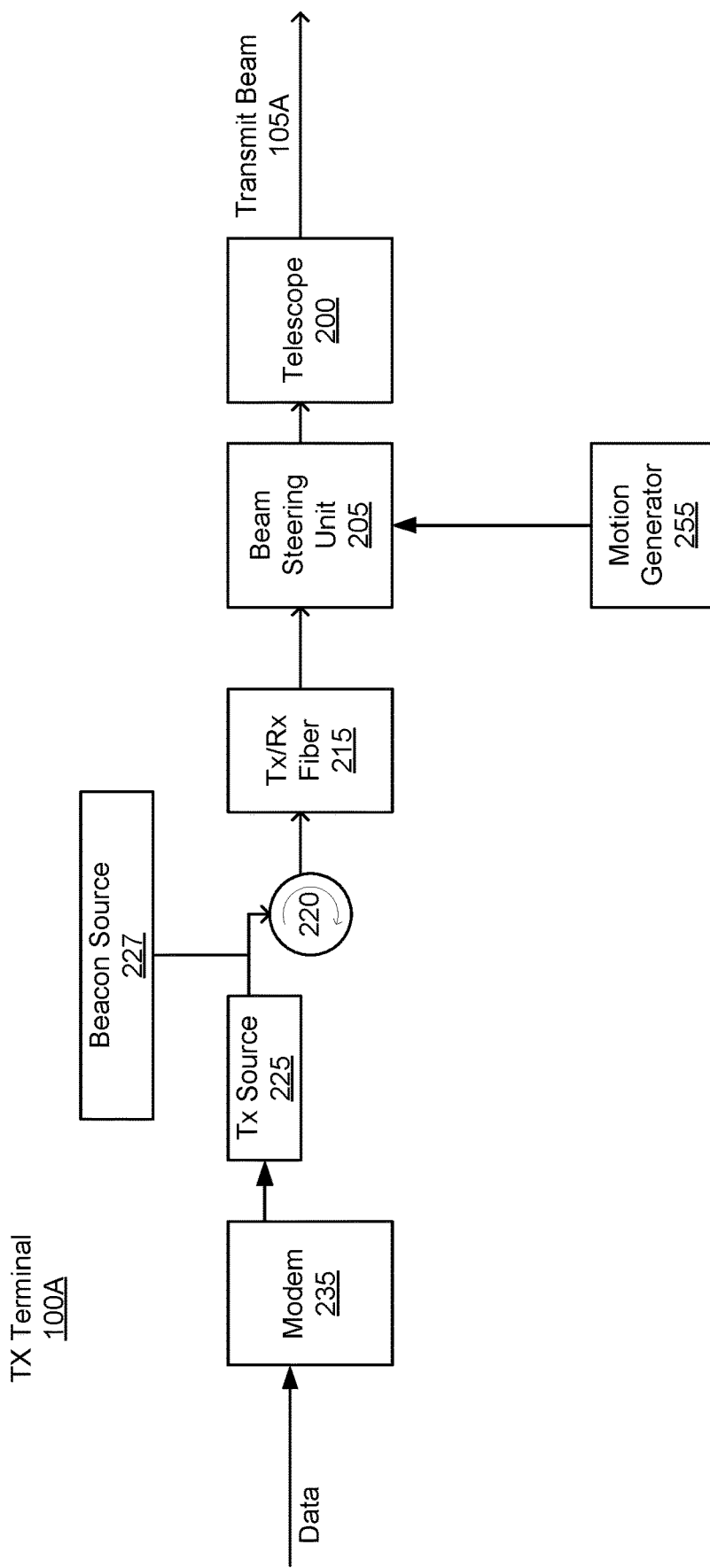
FIGS. 2B-2C are block diagrams of a single FSO communication link.
Figure 2C:
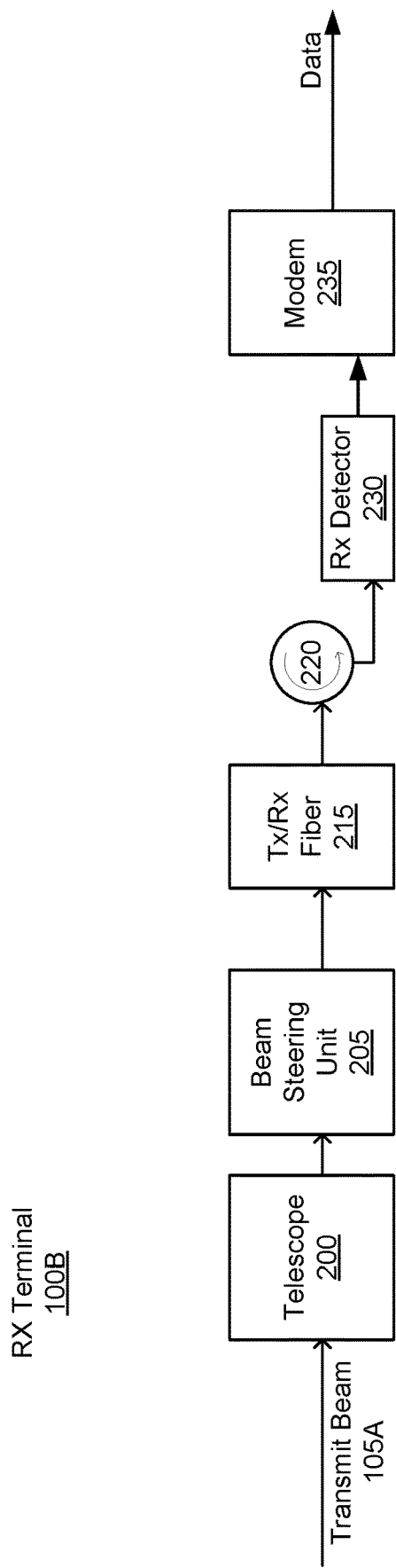

FIGS. 2B and 2C illustrate one FSO communication link from a Tx terminal to a Rx terminal. Specifically, FIGS. 2B and 2C show the data path from Tx terminal 100A to Rx terminal 100B. FIG. 2B shows the data path in the Tx terminal 105A from incoming digital data to outgoing FSO transmit beam 105A. Modem 235 modulates the Tx source 225 based on the incoming data. The data-encoded light is transmitted by circulator 220, fiber 215, beam steering unit 205 to telescope 200, which directs the data-encoded FSO beam 105A to the Rx terminal 100B. FIG. 2C shows the data path at the Rx terminal 100B. Relative to the Rx terminal 100B, the incoming beam is its Rx beam, but it is labelled as transmit beam 105A in FIG. 2C to maintain consistency throughout the figures. The transmit beam 105A is optically coupled from telescope 200, to beam steering unit 205, fiber 215, and circulator 220 to the Rx detector 230. The output of the Rx detector 230 is demodulated by modem 235 to produce the outgoing digital data.

FIG. 2A shows both aspects for a single terminal. The terminal 100 includes at least two optical paths: an Rx beam path and a Tx beam path. In the Rx beam path, a Rx beam 105B propagates through the telescope 200 and is directed towards the beam steering unit 205. The beam steering unit 205 steers the Rx beam to the wavefront sensor 210. A portion of the beam is detected by the wavefront sensor 210 and another portion of the beam is coupled into the fiber 215. Light in the fiber 215 is directed by the circulator 220 to the Rx detector 230. In the Tx beam path, a Tx beam from the Tx source 225 is directed to the fiber 215 by the circulator 220. The Tx beam is emitted from the fiber 215 and towards the beam steering unit 205. The Tx beam is directed by the beam steering unit 205 towards the telescope 200. The Tx beam 105A propagates through the telescope 200 and into free space.

The telescope 200 and beam steering unit 205 are optical components that direct Rx beams to the wavefront sensor 210 and fiber 215, and direct Tx beams to the remote terminal. In some embodiments, the telescope 200 is positioned upstream of the beam steering unit 205 with respect to the Tx beam path. The telescope 200 includes one or more components that can spread, focus, redirect, collimate, project, and otherwise modify the beams 105 passing through it. The position of the telescope 200 relative to the terminal 100 is typically fixed. The telescope 200 may be as simple as a single lens or it may include different or additional optical components, such as diffusers, phase screens, beam expanders, mirrors, and lenses. The telescope may also be referred to as a fore optic. The telescope 200 is further describe with reference to FIG. 5.

Many embodiments of the beam steering unit 205 are compatible with the present invention. This can be, for example, a mechanically driven reflective or refractive device. Examples of such devices include mirrors, Fresnel devices, and lenslet arrays. The mechanical driver for any one of these examples may include voice-coil actuators, piezoelectric actuators, and servo-motor driven positioners. Additionally or alternatively, microelectronic array (MEMS) devices or opto-acoustic devices that exploit acoustic waves in reflective or refractive materials can be used.

The beam steering unit 205 may operate in different modes, such as a beam acquisition mode or a beam tracking mode. For example, an initial Tx direction can be established through a beam acquisition mode. The Tx direction may be determined or updated based on feedback signals (e.g., alignment errors), for example from the controller 250, modem 235, and the wavefront sensor 210 (this feedback path not shown in FIG. 2). In some cases, the Tx beam 105A is transmitted by the telescope 200 along the same direction as the Rx beam 105B is received (the Rx direction may be determined from the wavefront sensor 210). In some cases, the Tx direction is not parallel to the Rx direction. For example, atmospheric conditions between terminals 100 can affect beams differently depending on their propagation direction. In these cases, Tx and Rx beams may travel different optical paths between terminals 100. In another example, the Tx beam is directed towards an expected future location of a remote terminal 100 (referred to as point ahead).

While steering Tx beams in a Tx direction towards a remote terminal, the beam steering unit 205 may dither the Tx direction. The motion generator 255 can generate control signals to dither the Tx direction. The Tx direction can be dithered along one or more axes. For example, conical scans (circular and elliptical) are two-dimensional dither patterns that may be used. The amplitude of the dither may be a fraction of the Tx beam size.

Figure 3A:
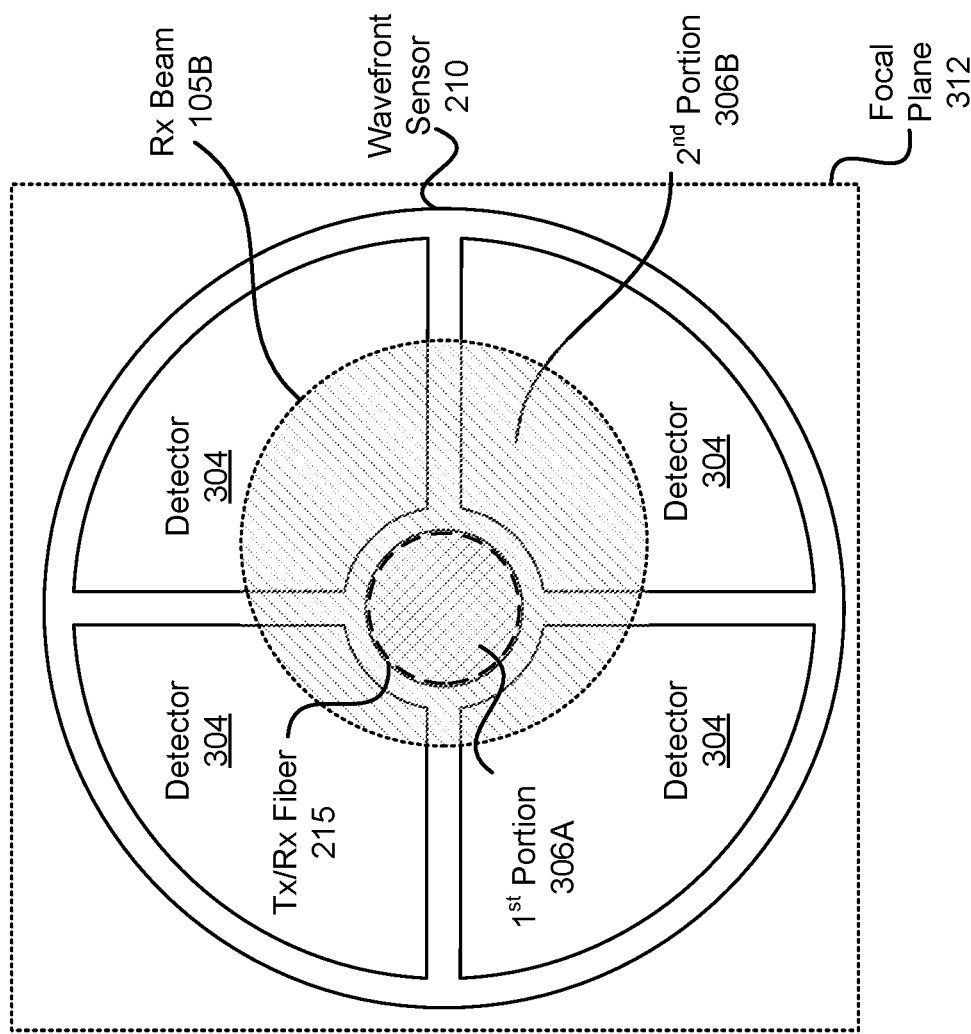
FIGS. 3A-3B are diagrams of a wavefront sensor at a telescope focal plane.
Figure 3B:
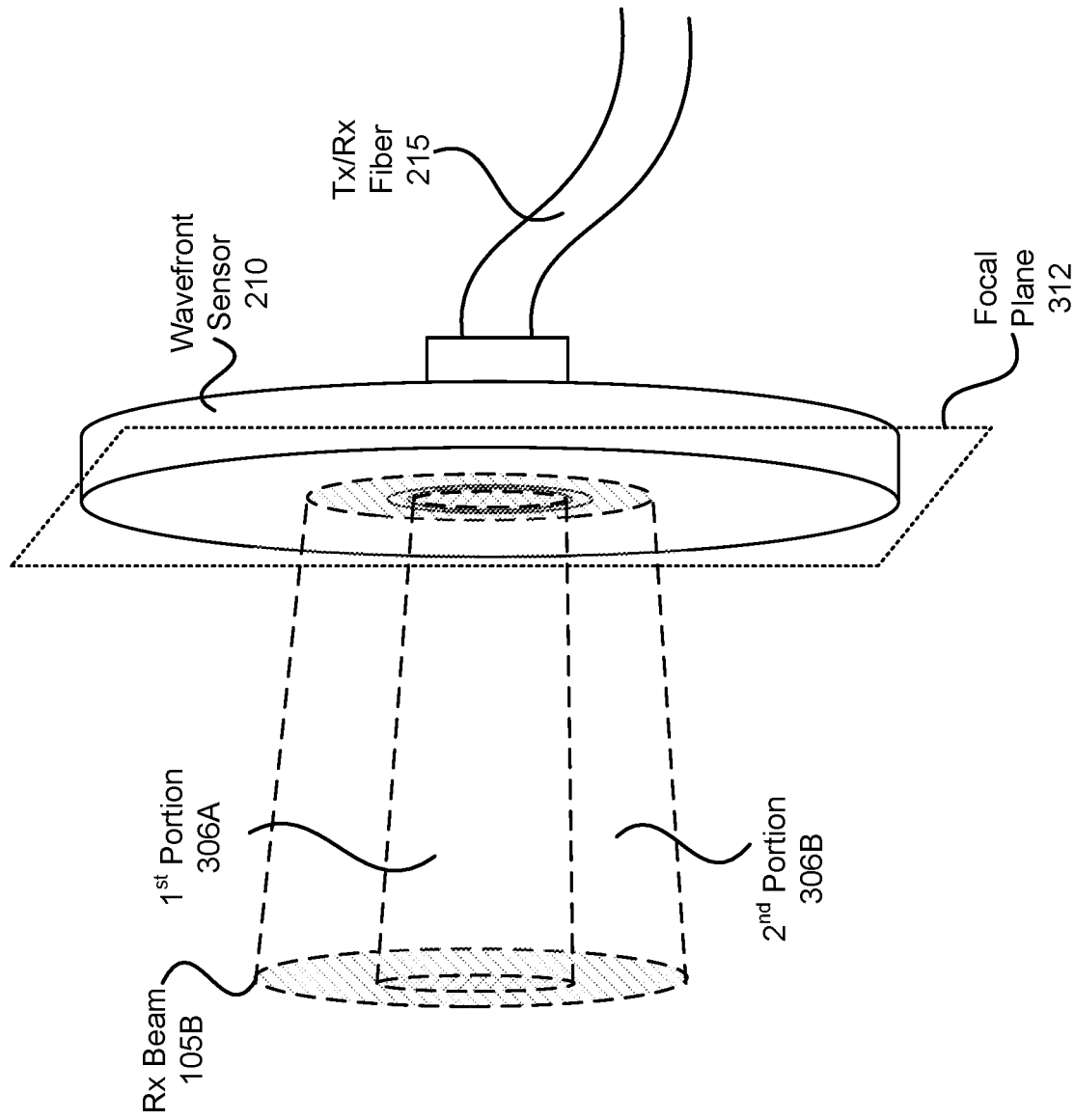

The wavefront sensor 210 is described with reference to FIGS. 3A and 3B. FIG. 3A is a front view of the wavefront sensor 210 and FIG. 3B is a perspective view of the wavefront sensor 210. The wavefront sensor 210 is a component that detects incident light (e.g., the Rx beam 105B) for position detection, acquisition, and tracking. The wavefront sensor 210 may be located at a focal plane 312 of the telescope 200. The wavefront sensor 210 includes a cavity (e.g., in the center) that surrounds an end of the Tx/Rx fiber 215. Thus, when an Rx beam 105B is directed to the focal plane 312, the Tx/Rx fiber 215 receives a portion of the Rx beam (the first portion 306A) and the wavefront sensor 210 receives another portion of the Rx beam (the second portion 306B). This allows light directed to the wavefront sensor 210 to be coupled into the fiber 215.

The wavefront sensor 210 is used for signal acquisition and alignment of the FSO terminal 100. To do this, the wavefront sensor 210 includes detectors 304 to determine the position of the incident Rx beam 105B. Based on the detected position of the Rx beam 105B, the FSO terminal 100 can align components of the FSO terminal 100 (e.g., the telescope 200, beam steering unit 205, or the wavefront sensor itself) so that the Rx beam 105B is centered on the wavefront sensor 210. The Rx beam 105B may be directed to another location on the wavefront sensor 201, for example if the fiber 215 is not centered on the sensor 210 or to account for point ahead. Components other than a wavefront sensor may additionally or alternately perform position detection, acquisition, and tracking. By way of example, a sensor can be an overmoded guided-wave structure with a means to measure the power in the structure's propagating modes.

In the example of FIGS. 3A and 3B, the wavefront sensor 210 is a quad-cell sensor. However other multi-cell sensors may be used. Together, the four detectors 304 can be used to determine the horizontal and vertical position of the Rx beam 206 on the wavefront sensor 202. The detectors 304 may be photodetectors or other electromagnetic-wave detectors that convert the incoming electromagnetic waves into electrical current. The wavefront sensor 210 can include light detectors capable of detecting different types of light signals, e.g., low and high light intensities, specific wavelengths, etc. This allows the terminal 100 to operate in low light (e.g., at night) and high light situations (e.g., at midday).

Referring back to FIGS. 2A-C, the Tx/Rx fiber 215 is an optical fiber, such as a multi-mode fiber (MMF), dual core fiber, or double clad fiber. If the fiber 215 is a double clad fiber, Tx beams may propagate through the core while Rx beams propagate through the inner cladding. The circulator 220 can be a single-mode or multi-mode circulator. Example circulators are described in patent application Ser. No. 16/259,899 "Optical Circulator with Double-Clad Fiber" which is incorporated herein by reference in its entirety. The Rx detector 230 is a photodetector that converts Rx beams from the circulator 220 into electrical signals. For example, the Rx detector 230 is an avalanche photodiode (APD). The Tx source 225 converts transmit data from the modem 235 into Tx beams. The Tx source 225 can include a laser.

The modem 235 modulates data to be transmitted in Tx beams. Specifically, the modem 235 converts incoming data from the I/O interface 240 into a modulated electrical signal. The modulated signal is sent to the Tx source 225 and converted into a Tx beam. The modem 235 can also demodulate data encoded in Rx beams. Specifically, the modem 235 decodes information in the electrical signals from the Rx detector 230. The remaining decoded information may be transmitted to I/O interface (e.g., to be transmitted to another terminal). The modem 235 can include any electronics and/or computer instructions that modulate or demodulate signals, including physical (PHY) layer or medium access control (MAC) related processes (such as error correction).

The beacon source 227 is an optical source (such as a laser) that can produce Tx optical beams 105. If the beacon source 227 and the Tx source 225 are separate components, the beacon source 227 may share a port of the circulator 220 with the Tx source 225 so that beams from the beacon source 227 are also directed by the fiber 215, beam steering unit 205 and telescope 200. In some embodiments, beams from the beacon source 227 have a fixed wavelength. In other embodiments, the beacon source 227 can produce optical beams at different wavelengths.

Optical beams 105 from the beacon source 227 may be used as beacon beams during a beam acquisition process to establish an FSO communication link and also during a tracking mode to maintain the FSO communication link. As a result, beacon beams typically have larger divergences than data-encoded beams from the Tx source 225. For example, the divergence of beacon beams may be two to four times larger than the divergence of the data-encoded beams (however larger and smaller ratios are also possible). Beam divergence is a measure of the increase in a beam's diameter or radius with distance. In some embodiments, the beacon source 227 and the Tx source 225 are a single component. That is, for example, the optical beam produced by the single source 227/225 is used both as a beacon beam during the beam acquisition process and as the data-encoded beam during data transmission.

The controller 250 receives information (e.g., from the wavefront sensor 210 and the modem 235) to determine alignment errors between the terminal 100A and the remote terminal 100B. The controller 250 provides instructions (e.g., to the beam steering unit 205) to reduce the alignment errors.

Dispersive Optical Component

Figure 4:
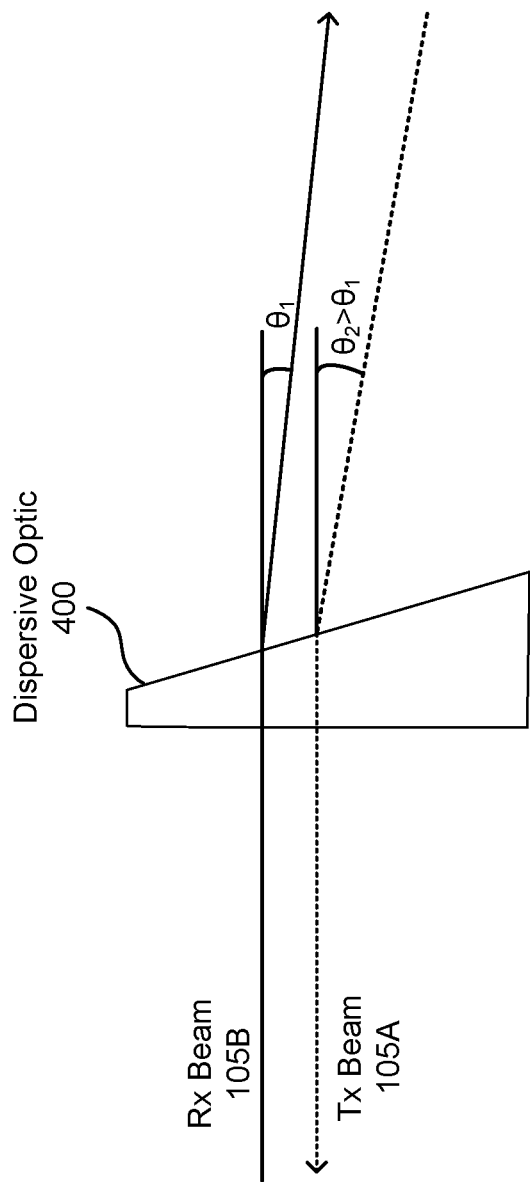
FIG. 4 is a diagram of a dispersive optical component that directs Tx and Rx beams with different wavelengths.

In some embodiments, the terminal includes a dispersive optical component positioned along optical paths of both the Rx and Tx beams (e.g., positioned in the telescope 200). Since the Tx and Rx beams have different wavelengths, a wavelength dependence of the dispersive optical component directs the Tx and Rx beams along different optical paths between the dispersive optical component and the focal plane 312. FIG. 4 provides a diagram of a dispersive optical component 400 (also referred to as a dispersive optic 400) that directs Tx and Rx beams with different wavelengths. In the example of FIG. 4, the Rx beam 105B is refracted downward at angle $\theta_1$ and the Tx beam 105A is refracted downward at angle $\theta_2$, where $\theta_1$ and $\theta_2$ result from the Rx and Tx wavelengths and optical properties of the dispersive optic 400 (discussed further below). In this example, $\theta_2$ is larger than $\theta_1$. However, this is not required. If dispersive optic 400 is a diffractive device, $\theta_1$ and $\theta_2$ may result from diffraction rather than refraction.

FIG. 4 illustrates the dispersive optic 400 in isolation to demonstrate how it affects the beams. However, the dispersive optic 400 may be part of the telescope 200 or another optical component of the terminal. FIG. 5A illustrates a cross-section diagram of the telescope 200 (with the dispersive optic 400), the wavefront sensor 210, and optical fibers 520 and 530 coupled to the wavefront sensor 210. The beam steering unit 205 is omitted for convenience. FIG. 5A also includes additional rays of the Tx and Rx beams 105 to illustrate the width of the beams before and after the telescope 200. FIG. 5B is provided for comparison. FIG. 5B is similar to FIG. 5A, except the telescope 200 does not include the dispersive optic 400 and the wavefront sensor 210 is coupled to a single fiber 215.

In the example of FIG. 5A, the Tx fiber 530 is a single-mode fiber, the Rx fiber 520 is a multi-mode fiber, and ends of the fibers are located at the focal plane 312 of the telescope 200. Since it may be difficult to place an object exactly at the focal plane, the phrase "at the focal plane" as used herein may refer to objects close enough to the focal plane that defocusing losses remain within acceptable limits for communication purposes. For example, an object "at the focal plane" refers to an object within 20 micrometers of the focal plane. In some embodiments, Tx beam collimation is more important than Rx focusing, and this sets the maximum acceptable distance for objects "at the focal plane." Tx beam collimation may depend on system focal length and it may vary between systems. In some embodiments, one or more fiber are not located at the focal plane 312. For example, an optical relay system creates a conjugate point so that a fiber end can be spaced apart from the focal plane. This is described in more detail with reference to FIG. 9.

As previously described, the telescope 200 includes optical components that receive the Rx beam 105B and focus it to a Rx spot 515 at the focal plane 312 and that direct the Tx beam 105A from a Tx spot 525 at the focal plane 312 to the remote terminal. In the examples of FIGS. 5A and 5B, the telescope 200 includes a window 500 that allows beams to propagate in and out of the terminal, a bi-focal lens 505, and a converging lens 510. When it is used, the bi-focal lens 505 may distribute some of the Rx signal over the WFS 210 and may thereby enable the telescope 200 to be pointed accurately toward the incoming Rx beam 105B. However, the telescope 200 may include different, additional, or fewer optical components. For illustrative convenience, the rays of the Rx and Tx beams in FIG. 5 are illustrated as if the optical components of the telescope 200 form a single optical component (the beams propagate straight through the telescope 200). However, each of the optical components may affect the beams according to their optical properties (e.g., the beams are bent by the dispersive optic 400 as shown in FIG. 4). The remaining figures are similarly illustrated in this fashion.

Without the dispersive optic 400 (as shown in FIG. 5B), the telescope 200 may direct the Rx beam 105B to the same location 535 as the Tx beam 105A at the focal plane 312. Thus, the Tx and Rx beams 105 propagate along a same fiber (the Tx/Rx fiber 215). In the example of FIG. 5B, the Tx/Rx fiber 520 is a double-clad fiber where the Tx beam 105A propagates through the single-mode core and the Rx beam 105B is coupled into the multi-mode cladding.

However, with the dispersive optic 400 (as shown in FIG. 5A), the telescope 200 may laterally separate the Rx spot 515 and the Tx spot 525 at the focal plane 312 so that the beams can be coupled to/from different fibers (Rx fiber 520 and Tx fiber 530). Specifically, the spots may be separated enough to couple light at the Rx spot 515 into the Rx fiber 520 and to couple light from the Tx fiber 530 to the Tx spot 525. For example, the spots are laterally separated in the focal plane by at least 125 micrometers). In some embodiments, this minimum separation distance is determined by the diameter of the optical fibers. In some embodiments, a multi-core fiber supports both Tx and Rx functions, and thereby supports even smaller separation distances between the Tx and Rx spots. In these embodiments, one or more fiber cores are allocated for Tx beams and one or more other cores are allocated for Rx beams. The Tx and Rx separation is then the distance between a Tx-allocated core and an Rx-allocated core. In some embodiments, the Rx-allocated core(s) may support multi-mode propagation. The double-clad fiber as shown in FIG. 5B is an example of this, where the Tx core is located within the Rx core. As used herein, a lateral direction is parallel to the focal plane 312.

The dispersive optic 400 may be a refractive optical component, such as a prism. A beam passing through a refractive optical component may refract according to Snell's law which states that the angle of refraction is based on the angle of incidence of the incoming beam, the index of refraction of the optical component, and index of refraction of the media outside of the component (e.g., air). In the example of FIGS. 4 and 5A, the dispersive optic 400 is a wedge that refracts beams by a fixed angle. A wedge is a prism with a shallow angle between its input and output surfaces. This angle may be between 0.1 and 20 degrees. In some embodiments, the dispersive optic 400 is a diffractive optical component. For example, the refractive optical component is a diffraction grating, which includes a periodic structure that diffracts light into several beams travelling in different directions.

The description herein refers to the dispersive optic 400 as a single optical component. However, this is merely for convenience. The dispersive optic 400 may include multiple optical components (e.g., it includes a refractive optical component and a diffractive optical component (e.g., a "prism")). In this case, the components may work in conjunction to achieve the desired wavelength dependence.

The location and spacing of the Tx an Rx spots at the focal plane 312 may depend on one or more factors, such as the wavelengths of the Tx and Rx beams 105 and the distance between the dispersive optic 400 and the focal plane (e.g., as measured along the Tx or Rx optical path). If the dispersive optic 400 is a refractive optic, the spacing may also depend on the thickness of the optic 400 and the variables in Snell's law. If the dispersive optic 400 is a diffraction grating, the directions of the beams may depend on the period of the grating.

To separate the Rx and Tx spots enough to couple beams to/from different fibers, the dispersive optic 400 may be spaced apart from the focal plane by at least one centimeter as measured along the optical path of the Rx beam. The dispersive optic 400 may be placed close to the bifocal 505 or the converging lens 510, or anywhere along the optical path of the Tx and Rx beams. For many embodiments, a location in 'collimated space' similar to the illustrated position is beneficial to reduce (e.g., minimize) undesirable aberrations. As stated above, the separation between spots may be based on the optic's 400 distance to the focal plane, its wedge angle, and its optical properties. When the dispersive optic 400 is placed as in FIG. 5A, the focal length of the converging lens 510 may also affect the spot separation. For good performance with low weight, the wedge angle may be selected to produce just enough separation between the spots 525 and 515 to prevent interference between the Tx and Rx beams (or reduce it below an acceptable threshold level). The wedge angle may fall between 0.1 and 20 degrees, with smaller angles preferred in telescope 200 designs having longer focal lengths.

In some embodiments, it is advantageous to reduce the size or weight of the FSO terminal (e.g., the terminal is mounted to an aircraft or satellite). In these embodiments, the maximum thickness of the dispersive optical component 400 may be 11 millimeters or less (e.g., measured as the largest distance between the input and output surfaces). In another example, the weight of the dispersive optical component 400 is not more than one-half of a kilogram (e.g., for a component 400 with a 100-millimeter diameter aperture, 11-degree wedge, and the typical density of glass or silicon). To reduce the size or weight of the dispersive optical component 400 but still have enough spot separation, the dispersive optical component 400 may be fabricated from a high-dispersion material such as silicon. In some embodiments, the dispersive optical component 400 has an index of refraction between 1.5 and 4.2. In some embodiments, to reduce the size or weight of the terminal, the dispersive optic 400 is combined with other optics in the telescope 200, such as the window 500 or the bi-focal lens 505.

For embodiments where the Tx and Rx wavelengths are selected from ITU channels (e.g., recommended in ITU publication G.694.1 or G.694.2 as described earlier), the Rx and Tx wavelength selections and differences between the wavelengths may be selected to match an available dispersive optic 400 and telescope 200 with to achieve the desired spot separation at the focal plane. Owing to the mechanical and electrical interoperability among products for these commonly-used wavelengths, the Tx and Rx wavelengths and hence the spot distance may be modified for a given terminal by interchanging compatible products.

Referring back to FIG. 5A, if the terminal includes a dispersive optic 400, the wavefront sensor 210 may be modified to support multiple fibers instead of the single Tx/Rx fiber 215. For example, the size of the fiber cavity may be larger, the shape of the cavity may be modified, or the wavefront sensor 210 may include additional cavities. With separate Tx and Rx fibers, the telescope 200, wavefront sensor 210, or the beam steering unit 205 may be dynamically positioned during operation of the terminal so that the Rx spot 515 is laterally aligned with the Rx fiber 520 (resulting in the Rx beam 105B being coupled into the Rx fiber 520). This may also result in the Tx beam 105A being projected towards the remote terminal. In the example of FIG. 5A, the Rx fiber 520 is at the center of the wavefront sensor 210 and the Tx fiber 530 is below the Rx fiber 520, however this is not required. The positioning of the fibers relative to each other and on the wavefront sensor 210 may depend on the expected locations of the Rx and Tx spots, which may depend on the wavelengths of the Tx and Rx beams, the optical properties of the dispersive optic 400, the focal length of the converging lens 510, and the position of the dispersive optic 400 (e.g., relative to the converging lens 510 or the focal plane) (as previously discussed).

Figure 6:
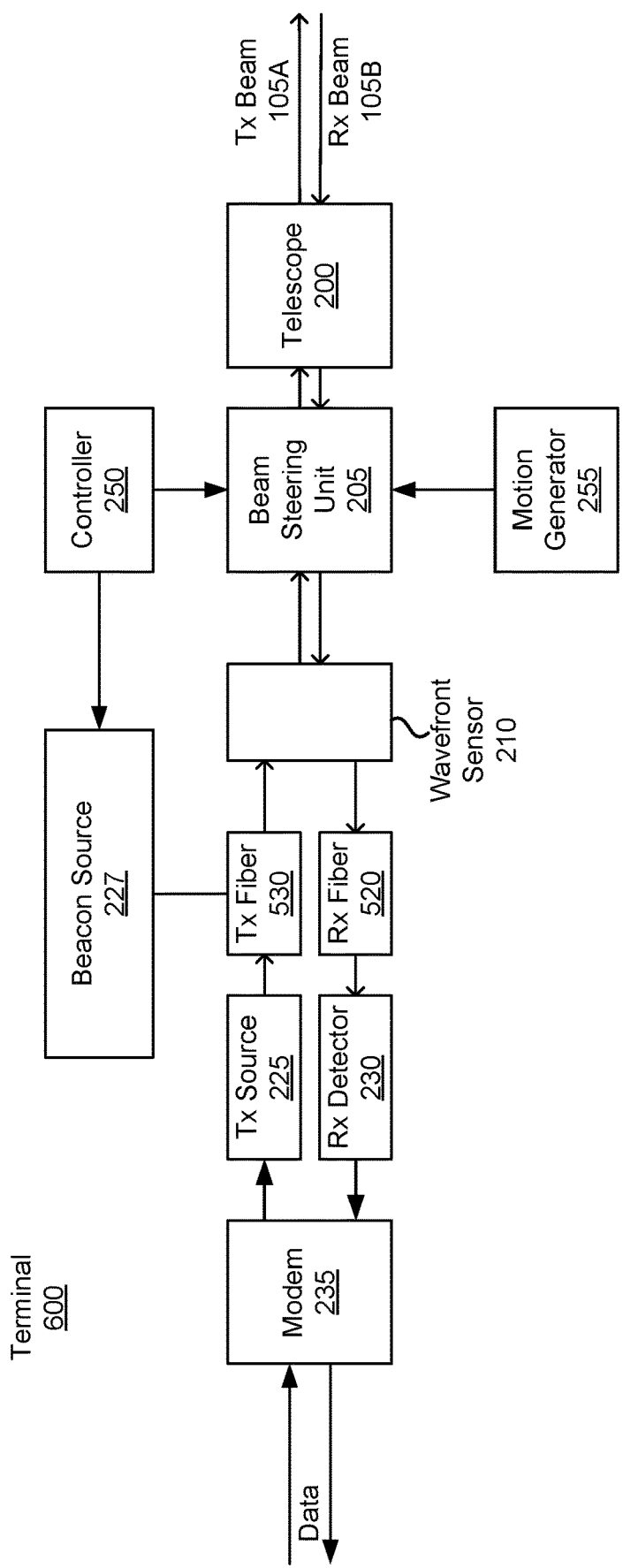
FIG. 6 is block diagram of a terminal without a circulator.

Due to the dispersive optic 400, the components of the terminal illustrated in FIG. 2 may be modified. Since the dispersive optic 400 results in separated Rx and Tx spots, the circulator 220 can be removed from the terminal. Said differently, if a terminal includes a dispersive optic 400, then the terminal may not have a circulator 220 positioned along the optical paths of the Rx and Tx beams 105. (If the terminal uses a component other than a circulator to separate the beams 105, such as a beam splitter or a wave division multiplexer, then that component may similarly be removed). FIG. 6 illustrates a second block diagram of an FSO terminal 600. Terminal 600 in FIG. 6 is like terminal 100 in FIG. 2, except the circulator 220 is removed and Tx/Rx fiber 215 is replaced with separate Tx and Rx fibers (530 and 520).

In some embodiments, the dispersive optic 400 has transmission losses below 2 dB. In some embodiments, the terminal may become more efficient by using a dispersive optic 400 instead of the circulator 220. A circulator 220 may result in optical losses of 2-4.5 dB. Depending on the terminal, 2-4.5 dB may correspond to losses of 20 watts or more (e.g., to increase the Tx beam by 2-4.5 dB, the Tx source may need 20 additional watts of power).

Additionally, installation of the dispersive optic 400 during manufacture of the terminal may be easier than installation of a circulator or beam splitter. For example, a beam splitter may require a precise alignment process to ensure light is directed in the desired directions. A refractive wedge, on the other hand, may simply be rotationally aligned (so that the beams bend toward the Rx and Tx fibers) and inserted into the optical paths of the Rx and Tx beams 105.

In some embodiments, the terminal can transmit and receive beams at any of the available Tx/Rx wavelengths (e.g., wavelengths "A" and "B"). This allows the terminal to communicate effectively with remote terminals regardless of what wavelengths they transmit and receive. To do this, the terminal may include multiple Tx fibers or multiple Rx fibers. Without multiple fibers, a terminal may not be able to communicate effectively at all the available wavelengths. For example, if a terminal is only configured to receive Rx beams 105B at wavelength "B" but it receives a beam at wavelength "A," the wavelength dependence of the dispersive optic 400 may result in the Rx beam 105B not being coupled into the Rx fiber 520 (e.g., the Rx spot is at the Tx spot). Thus, to transmit and receive beams at any of the available Tx/Rx wavelengths, terminal may include multiple Tx fibers or multiple Rx fibers. The terminal may also shift the position of the fibers depending on the selected wavelengths (e.g., via a gimbal or actuator system).

FIGS. 7A and 7B illustrate a terminal with two Tx fibers (530A and 530B) laterally spaced apart on laterally opposite sides of the Rx fiber 520. In these figures, the lines of the beams 105 (dotted or solid) represent their wavelengths.

Figure 7C:
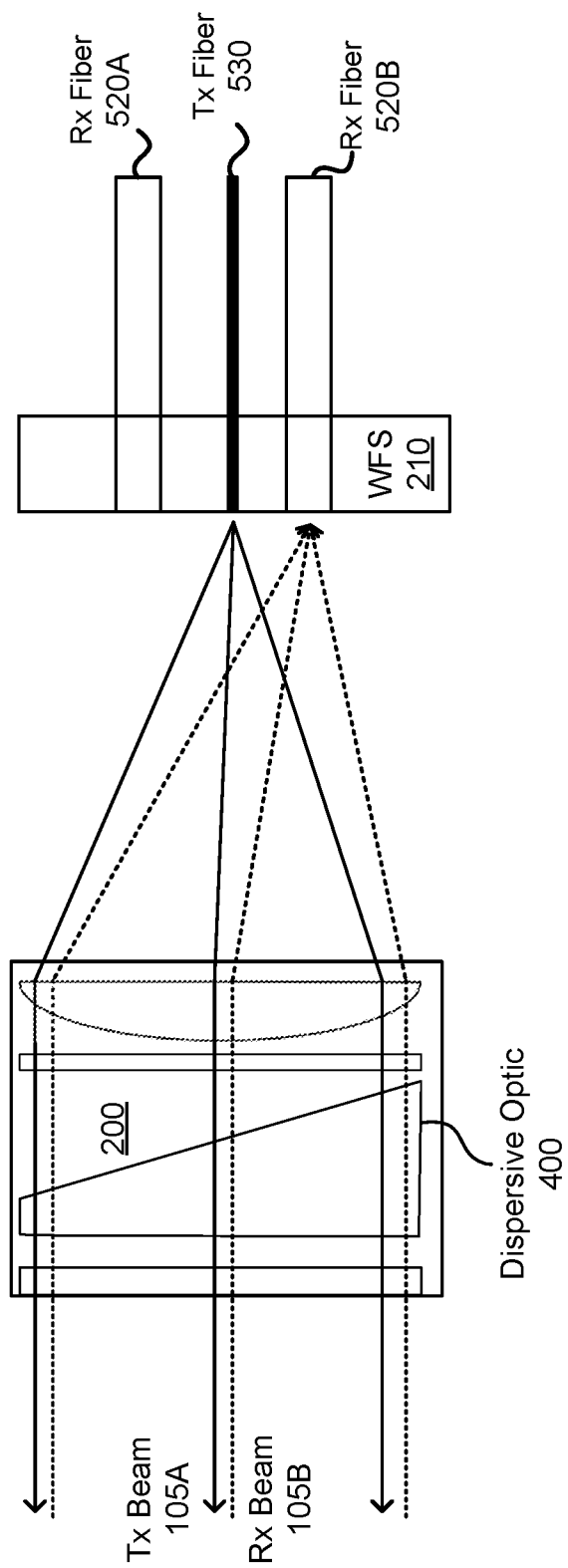

In FIG. 7A, the Rx beam 105B (solid lines) is directed to the Rx fiber 520 and the Tx beam (dotted lines) is directed from the Tx fiber 530B into free space. However, if the Tx and Rx wavelengths are switched (e.g., because the remote terminal switches the wavelengths or the local terminal communicates with a different remote terminal), then the terminal can shift the fibers (and possibly the wavefront sensor 210) downward (FIG. 7B) so that the Rx beam (dotted lines) is still directed to the Rx fiber 520 and the Tx beam (solid lines) is directed from the Tx fiber 530A into free space. Additionally or alternatively, as seen in FIG. 7C, a terminal may include two Rx fibers (520A and 520B) laterally spaced apart on opposite sides of the Tx fiber 530.

To transmit either wavelength, the terminal may have multiple Tx sources 225 or a single tunable Tx source 225 configured to transmit beams at any of the available wavelengths (e.g., wavelength "A" or "B"). To receive at either wavelength, the terminal may include multiple Rx detectors 230 or a single Rx detector configured to receive beams from either Rx fiber 520 at any of the available wavelengths (e.g., wavelength "A" or "B").

Point Ahead

In some situations, the remote terminal may be in motion relative to the local terminal. To account for travel time of the Tx beam (e.g., when the relative velocity or distance between the local and the remote terminal is large), the local terminal may direct a Tx beam towards an expected future location of the remote terminal (instead of the current location of the remote terminal). This is generally referred to as point ahead, and the angular bias between the Rx and Tx beams is referred to as the point ahead angle. Depending on the situation, point ahead angles are approximately 100 microradians or less.

Figure 8A:
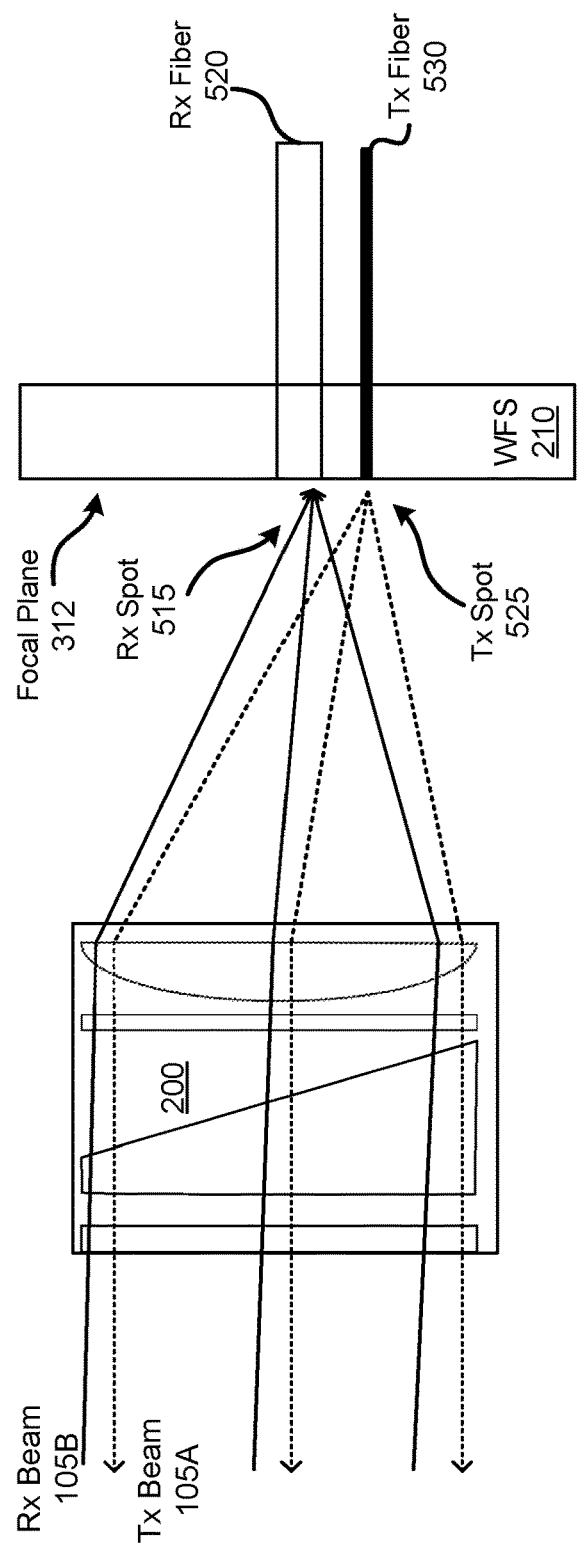
FIGS. 8A-8B are cross-section diagrams illustrating the effect of point ahead at the wavefront sensor.
Figure 8B:
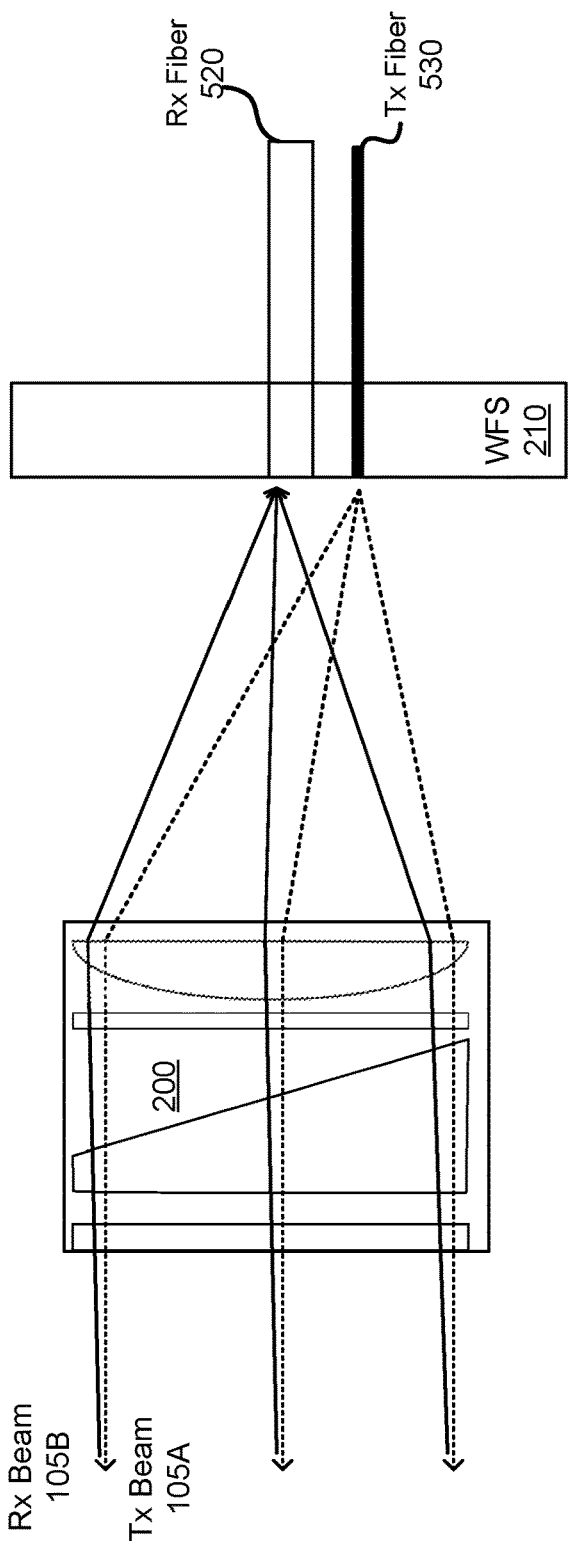

FIGS. 8A and 8B are cross-section diagrams of the telescope 200 (including the dispersive optic 400) and the wavefront sensor 210. These figures illustrate the effect of point ahead at the wavefront sensor 210 (the incoming Rx beam 105B is received at a different angle than the Tx beam 105A). Specifically, the point ahead angle further affects the location of the Rx spot 515 in the focal plane 312. Said differently, the Rx and Tx spot separation in the focal plane 312 is affected by the point ahead angle (in addition to the other previously described factors, such as the beam wavelengths). For example, changing the point ahead angle by 50 microradians results in the Rx spot 515 laterally moving by 20-30 micrometers. Said differently, the pointing ratio may be approximately 2.5 microradians per 1 micrometer at the focal plane.

If the point ahead angle is too large, the Rx spot 515 may not align with the end of the Rx fiber 520, and the Rx beam 105B may not couple into the Rx fiber 520. To increase the amount of light coupled into the Rx fiber 520 for various point ahead angles, it may be advantageous for the Rx fiber 105B to have a large aperture (e.g., a multi-mode fiber instead of a single-mode fiber). For example, depending on the optics in the telescope 200, a multi-mode fiber with a 105-micrometer diameter core can be used for point ahead angles of approximately 100 microradians or less. Thus, beams with point ahead may be coupled into the Rx fiber 520 without mechanically adjusting the location of the Rx fiber 520.

Actuator and Optical Relay Systems

An actuator system may also increase the point ahead capabilities of a terminal (e.g., if a multi-mode fiber is not feasible or if larger point ahead angles are desired). The actuator system is coupled to the Rx fiber 520 and can adjust the lateral position of the end of the Rx fiber 520 in the focal plane to receive the Rx beam 105B. Additionally or alternatively, the actuator system may be coupled to the Tx fiber 530 and may laterally adjust the Tx fiber 530 to change the point ahead angle.

For example, in some situations it is desirable for the Rx fiber 520 to be a single-mode fiber (e.g., due to internal space constraints or an FSO communication standard requires the terminal to use a single-mode fiber). Since a single-mode fiber has a smaller aperture size compared to a multi-mode fiber, the terminal may have limited point ahead capabilities (e.g., 20 microradians or less). However, if the terminal includes the actuator system, the actuator system can move the Rx fiber 520 to increase the point ahead capabilities of the terminal.

The actuator system may be inside the cavity of the wavefront sensor 210. However, if the actuator system is too large to fit in the cavity or if it is too large to fit between the Tx and Rx fibers, the terminal may include an optical relay system to axially separate the end of the Rx fiber 520 from the end of the Tx fiber 530. This axial separation creates additional space around the end of the fiber so that the actuator system can be used. As used herein, the axial direction is along the optical axis (ignoring differences between the Tx and Rx optical axes)

Figure 9:
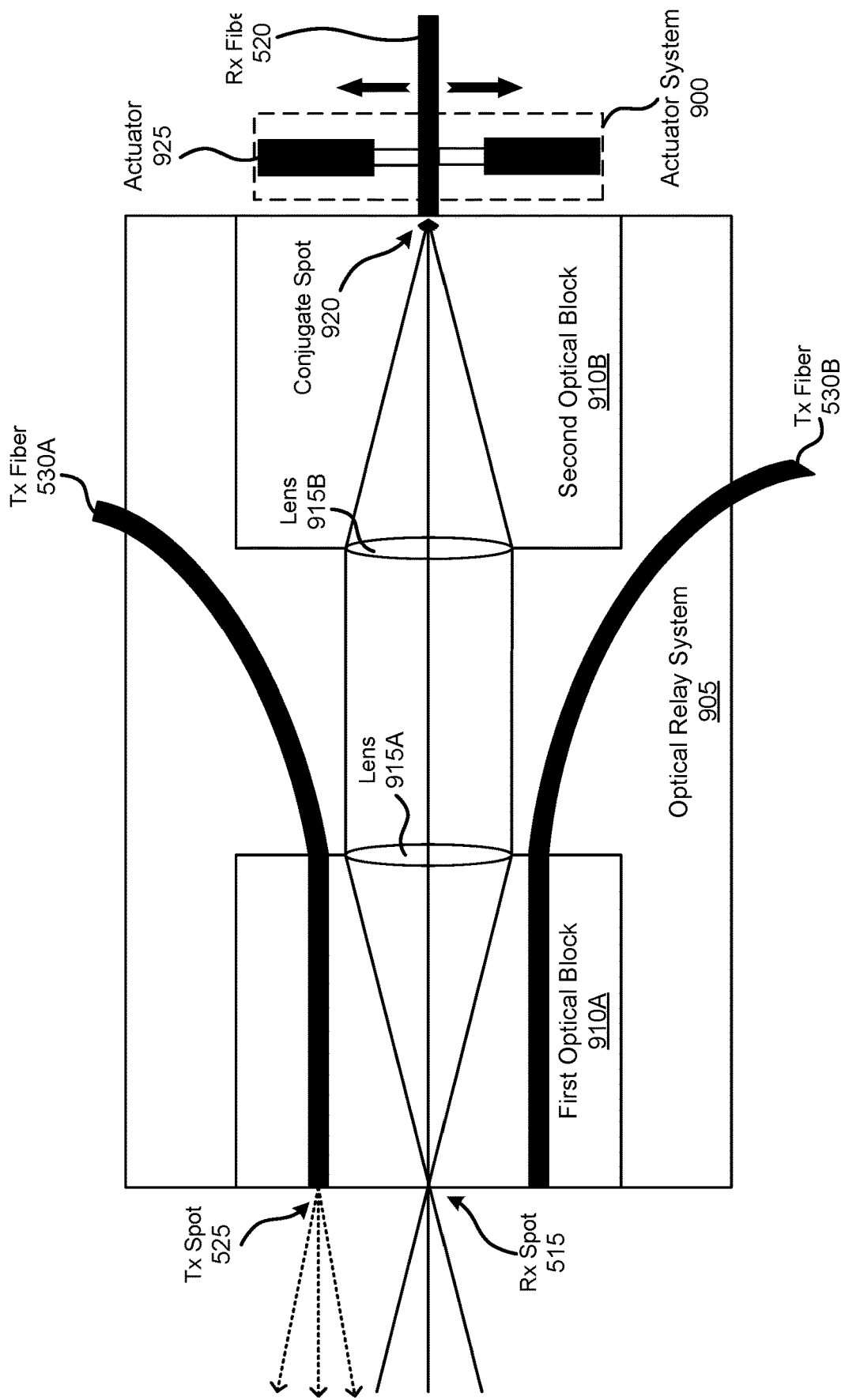
FIG. 9 is a diagram of an optical relay system and actuator system.

An example actuator system 900 and optical relay system 905 are illustrated in FIG. 9. Note that while the optical relay system 905 is illustrated with the actuator system 900, the optical relay system 905 does not need to be used with the actuator system 900.

Referring to FIG. 9, the optical relay system 905 creates a conjugate spot 920 to the Rx spot 515, so that the Rx fiber 520 can be positioned behind the focal plane 312 instead of at the focal plane. For example, the optical relay system 905 creates a conjugate spot 920 to axially separate the ends of the Rx and Tx fibers by at least 5 millimeters behind the Tx focal plane. As stated above, this axial separation may be useful if the separation of the Tx and Rx spots without relay does not provide enough space for the actuator system 900 (e.g., the Tx and Rx spots are laterally separated by less than 2 millimeters). However, the optical relay system 905 may still be beneficial at larger spot separation distances, such as distances of 5, 10, or 50 millimeters (e.g., to change the lateral range over which conjugate spot 920 may appear (described below)). In another example, optical relay system 905 is used if an actuator of the actuator system 900 is longer than the lateral separation of the Tx and Rx spots. In some embodiments, lenses 915A and 915B have different focal lengths and therefore magnify or reduce the range of lateral positions over which the conjugate spot 920 may appear. If the actuator lacks range, range reduction may be advantageous and if the actuator has sufficient range but poor positioning accuracy, magnification may be advantageous.

To create the conjugate spot 920, the optical relay system 905 includes two lenses 915 along the optical path of the Rx beam 105B. The lenses 915 may be converging lenses that create a 1:1 imaging of the Rx spot 515 to the conjugate spot 920. As stated earlier, the lenses may have differing focal lengths and thereby magnify or reduce the lateral range of the conjugate spot 920. The differing focal lengths may change the convergence angle of the Rx beam 105B at the conjugate spot to more efficiently match the Rx fiber core's numerical aperture. The lenses 915 are held in place by two optical blocks 910. In some embodiments, the optical relay system 905 creates multiple conjugate spots e.g., a Rx conjugate spot and a Tx conjugate spot, so that neither of the fibers are at the focal plane. In these embodiments, the optical relay system 905 may include additional optical components, such as additional lenses and mirrors.

The first optical block 910A holds the Tx fiber 530 in place at the focal plane. To do this, the first block 910A may also be at the focal plane or near the focal plane. The Rx beam 105B may propagate directly through the first block 910A (e.g., the block is made of transparent material, such as $SiO_2$ or Si) or the first block 910A may have a cavity that the Rx beam 105B propagates through. In some embodiments, the blocks 910 are made of a same material as the lenses 915. In FIG. 9, the first block 910A supports two Tx fibers (530A and 530B), which are on laterally opposite sides of the Rx fiber 520. However, the Tx fibers 530 may be positioned elsewhere, and additional or fewer Tx fibers 530 may be present. Additional Tx fibers 530, if present, may support additional combinations of Tx and Rx wavelengths and may thereby enlarge the number of remote terminals available for communication.

The second optical block 910B is located downstream from the first block 910A (relative to the Rx beam). Like the first optical block 910A, the Rx beam 105B may propagate directly through the second block 910B or the second block 910A may have a cavity. The second block 910B may be in contact with an end of the first block 910A or the blocks may be spaced apart, as shown in FIG. 9. Depending on the lenses 915, the conjugate spot 920 may be located inside the second block 910B or it may be outside (e.g., behind) the second block 910B. Consequently, the Rx fiber 520 may be behind or inside the second block 910B.

Referring back to the actuator system 900, the actuator system 900 aligns the end of the Rx fiber 520 with the conjugate spot 920 so the Rx fiber 520 can receive the Rx beam 105B. As described above, the Rx spot may move in the focal plane depending on the point ahead angle. In some embodiments, the point ahead angle amplitude and direction are known from other sources e.g., from satellite orbital data or from an aircraft or vehicular navigation system. Since Tx orientation by dead-reckoning may not be sufficiently accurate for a remote terminal at large range, the terminal may adjust its direction relative to the incoming Rx beam and rely on the known point-ahead angle to direct the Tx beam with high accuracy.

The actuator system 900 includes a least one actuator, such as a piezoelectric actuator (e.g., a lead zirconate titanate (PZT) actuator) or a voice-coil actuator, to move the end of the Rx fiber 520 in one or two dimensions in the lateral direction. The Rx fiber 520 may be moved along a flexure mount or a translation stage (not illustrated). The actuator system 900 may be configured to move the end of the Rx fiber 520 (or the Tx fiber 530) up to 150 micrometers along either axis in the lateral direction. This range of movement may be based on, for example, the maximum expected point ahead angle or the average point ahead angle. As discussed earlier, a design using relay lenses (e.g., as shown in FIG. 9), may incorporate magnification or reduction to match the required actuator range with the system's 900 capabilities.

To provide example dimensions, the optical relay system 905 may be on a micro-bench that is 7 millimeters long in the axial direction and 5 millimeters long in the lateral direction. The optical blocks 910 may be 2 millimeters thick in the axial direction, and the spacing between the optical blocks 910 may be 3 millimeters. The fibers held by the first optical block 910A may have a half-inch bend radius.

As previously stated, the actuator system 900 may also adjust a lateral position of the Tx fiber 530 (in addition to or instead of positioning the Rx fiber 520). Additionally or alternatively, the optical relay system 905 may be used to relay the Tx beam between a Tx spot and the conjugate spot 920. An example of this can be visualized in FIG. 9 by switching the Tx and Rx fiber labels (and beam propagation directions). For example, the actuator system 900 is coupled to the Tx fiber 530 and the first optical block 910A supports one or more Rx fibers 520 at the focal plane.

Neither the actuator system 900 nor the optical relay system 905 require the dispersive optic 400. To use the actuator system 900 or the optical relay system 905, other optical components may be used to laterally separate the Rx and Tx spots (e.g., a beam splitter or circulator). The actuator system 900, optical relay system 905, and telescope 200 may be collectively referred to as an optical module.

Although the above descriptions are described in the context of FSO communications, the above description may be applicable for applications outside of FSO communications, and thus should not be limited to FSO communications. For example, the descriptions may be applicable for remote sensing applications.

Additional Considerations

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Depending on the form of the components, the "coupling" between components may take different forms. For example, dedicated circuitry can be coupled to each other by hardwiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A local free space optical (FSO) communication terminal configured to transmit optical beams to and receive optical beams from a remote FSO communication terminal, the local FSO communication terminal comprising:
   a fore optic having a focal plane, wherein a receive (Rx) optical beam from the remote FSO communication terminal is received and focused by the fore optic to a Rx spot at the focal plane and a transmit (Tx) optical beam forms a Tx spot at the focal plane and is collimated and projected by the fore optic to the remote FSO communication terminal; and a dispersive optical component that is positioned along optical paths of both the Rx optical beam and the Tx optical beam so that the Tx and Rx beams propagate through the dispersive optical component, wherein the Rx optical beam has one or more different wavelengths than the Tx optical beam, and a wavelength dependence of the dispersive optical component laterally separates the Rx spot and the Tx spot at the focal plane.

2. The local FSO communication terminal of claim 1, wherein the dispersive optical component is a refractive optical component.

3. The local FSO communication terminal of claim 2, wherein the dispersive optical component is a wedge.

4. The local FSO communication terminal of claim 1, wherein the dispersive optical component has transmission losses below 2 dB at the Tx and Rx wavelengths.

5. The local FSO communication terminal of claim 1, wherein the dispersive optical component is a window of the local FSO communication terminal.

6. The local FSO communication terminal of claim 1, wherein the dispersive optical component is a diffractive optical component.

7. The local FSO communication terminal of claim 6, wherein the diffractive optical component is a diffraction grating.

8. The local FSO communication terminal of claim 1, wherein optical paths of the Rx optical beam and of the Tx optical beam in the local FSO communication terminal are circulator-less.

9. The local FSO communication terminal of claim 1, wherein the lateral separation of the Rx spot and the Tx spot at the focal plane is not a result of a beam splitter positioned along optical paths of the Rx optical beam or the Tx optical beam.

10. The local FSO communication terminal of claim 1, wherein the Rx optical beam is coupled from the Rx spot into an Rx fiber and the Tx optical beam is coupled from a Tx fiber to the Tx spot.

11. The local FSO communication terminal of claim 10, wherein the Rx fiber and the Tx fiber are single mode fibers.

12. The local FSO communication terminal of claim 1, further comprising a multi-core fiber with a first core and a second core, wherein the Rx optical beam is coupled from the Rx spot into the first core and the Tx optical beam is coupled from the second core to the Tx spot.

13. The local FSO communication terminal of claim 1, wherein at least one of:
    the Rx spot and the Tx spot are laterally separated by at least 125 micrometers; or
    the Rx spot and the Tx spot are laterally separated enough to reduce interference between the Tx and Rx beams at the focal plane below a threshold level.

14. The local FSO communication terminal of claim 1, wherein the Tx and Rx wavelengths are selected from wavebands covered by ITU (International Telecommunication Union) channels.

15. The local FSO communication terminal of claim 14, wherein the Tx and Rx wavelengths are selected from ITU publication G.694.1 or G.694.2.

16. The local FSO communication terminal of claim 14, wherein either or both the Tx and Rx wavelengths are within 100 nm wavelength of 1064 nm.

17. The local FSO communication terminal of claim 1, wherein the dispersive optical component has an index of refraction larger than 1.5 and smaller than 4.2.

18. The local FSO communication terminal of claim 1, wherein the Tx optical beam propagates through the dispersive optical component by entering the dispersive optical component at a first surface and exiting the dispersive optical component at a second surface, and wherein the Rx optical beam propagates through the dispersive optical component by entering at the second surface and exiting at the first surface.

19. A local free space optical (FSO) communication terminal configured to transmit optical beams to and receive optical beams from a remote FSO communication terminal, the local FSO communication terminal comprising:
    a fore optic having a focal plane, wherein a receive (Rx) optical beam from the remote FSO communication terminal is received and focused by the fore optic to a Rx spot at the focal plane and a transmit (Tx) optical beam forms a Tx spot at the focal plane and is collimated and projected by the fore optic to the remote FSO communication terminal; and
    a dispersive optical component that is positioned along optical paths of both the Rx optical beam and the Tx optical beam,
    wherein:
        the Rx and Tx optical beams are different wavelengths;
        a wavelength dependence of the dispersive optical component laterally separates the Rx spot and the Tx spot at the focal plane;
        the Rx optical beam is coupled from the Rx spot into an Rx fiber and the Tx optical beam is coupled from a Tx fiber to the Tx spot; and
        the Rx beam has a first wavelength, and the local FSO communication terminal further comprises:
            a second Tx fiber on a laterally opposite side of the Rx fiber relative to the Tx fiber; and
            a Tx optical source, the Tx optical source coupled to the second Tx fiber and configured to produce a second Tx optical beam with the first wavelength.

20. A local free space optical (FSO) communication terminal configured to transmit optical beams to and receive optical beams from a remote FSO communication terminal, the local FSO communication terminal comprising:
    a fore optic having a focal plane, wherein a receive (Rx) optical beam from the remote FSO communication terminal is received and focused by the fore optic to a Rx spot at the focal plane and a transmit (Tx) optical beam forms a Tx spot at the focal plane and is collimated and projected by the fore optic to the remote FSO communication terminal; and
    a dispersive optical component that is positioned along optical paths of both the Rx optical beam and the Tx optical beam,
    wherein:
        the Rx and Tx optical beams are different wavelengths;
        a wavelength dependence of the dispersive optical component laterally separates the Rx spot and the Tx spot at the focal plane;
        the Rx optical beam is coupled from the Rx spot into an Rx fiber and the Tx optical beam is coupled from a Tx fiber to the Tx spot; and
        the Tx beam has a first wavelength, and the local FSO communication terminal further comprises:
            a second Rx fiber on a laterally opposite side of the Tx fiber relative to the Rx fiber; and an Rx optical detector, the Rx optical detector coupled to the second Rx fiber, the Rx optical detector configured to receive a second Rx beam with the first wavelength.

* * * * *